United States Patent
Gupta et al.

(10) Patent No.: US 10,721,335 B2
(45) Date of Patent: Jul. 21, 2020

(54) REMOTE PROCEDURE CALL USING QUORUM STATE STORE

(71) Applicant: HEWLETT PACKARD ENTERPRISE DEVELOPMENT LP, Houston, TX (US)

(72) Inventors: Manan Gupta, San Jose, CA (US); Tomasz Barszczak, San Jose, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 171 days.

(21) Appl. No.: 16/051,649

(22) Filed: Aug. 1, 2018

(65) Prior Publication Data
US 2020/0045139 A1 Feb. 6, 2020

(51) Int. Cl.
- *H04L 29/06* (2006.01)
- *G06F 9/54* (2006.01)
- *H04L 12/26* (2006.01)
- *H04L 29/08* (2006.01)

(52) U.S. Cl.
CPC .............. *H04L 67/40* (2013.01); *G06F 9/547* (2013.01); *H04L 43/10* (2013.01); *H04L 67/10* (2013.01); *H04L 67/42* (2013.01)

(58) Field of Classification Search
CPC ......... H04L 67/40; H04L 67/10; H04L 67/42; H04L 43/10; G06F 9/547
See application file for complete search history.

(56) References Cited

U.S. PATENT DOCUMENTS

| | | | |
|---|---|---|---|
| 7,478,263 B1 * | 1/2009 | Kownacki | G06F 11/2028 714/10 |
| 9,306,825 B2 * | 4/2016 | Prahalad | H04L 12/1895 |
| 9,710,344 B1 * | 7/2017 | Helmick | G06F 11/2028 |

(Continued)

FOREIGN PATENT DOCUMENTS

WO   WO-2018028845 A1   2/2018

OTHER PUBLICATIONS

French, T.; "etcd3 leader election using Python"; Nov. 8, 2017; 4 pages; <https://www.sandtable.com/etcd3-leader-election-using-python/>.

(Continued)

*Primary Examiner* — Tauqir Hussain
(74) *Attorney, Agent, or Firm* — Nolte Intellectual Property Law Group

(57) ABSTRACT

A method, system, and non-transitory computer readable medium are disclosed to regarding remote procedure call (RPC) functionality from a requestor node to a processing node using a quorum state store communication protocol. Records from a quorum state store may be augmented to include an indication of both the processing node and the requestor node; remote procedure call (RPC) request information; and information including RPC coordination information. Heartbeat messages may propagate updated quorum state store records throughout the quorum. Requestor nodes and processing nodes may perform requested functions and supply status information via updates to their own quorum state store records. Quorum state store records may be propagated throughout the quorum even when direct communication between requestor nodes and processing nodes may not be available.

20 Claims, 8 Drawing Sheets

(56) References Cited

U.S. PATENT DOCUMENTS

| | | | |
|---|---|---|---|
| 9,923,975 B2* | 3/2018 | Galchev | G06F 9/5027 |
| 9,979,791 B2* | 5/2018 | Aw | G08B 13/19656 |
| 2001/0008019 A1* | 7/2001 | Vert | G06F 11/1662 |
| | | | 714/1 |
| 2017/0026468 A1* | 1/2017 | Kumar | H04L 69/28 |

OTHER PUBLICATIONS

Mizerany, B.: "About Etcd, the Distributed Key-Value Store Used for Kubernetes, Google's Cluster Container Manager"; Jul. 11, 2014; 12 pages; <https://thenewstack.io/about-etcd-the-distributed-key-value-store-used-for-kubernetes-googles-cluster-container-manager/>.

Philips et al., "Etcd v3: increased scale and new APIs (coreos.com)," 2016, 6 pages; (internet forum), <https://news.ycombinator.com/item?id=12011066>.

Strittmatter, B.; "Understanding Etcd Consensus and How to Recover from Failure"; May 30, 2018; 7 pages; <https://blog.containership.io/etcd/>.

* cited by examiner

US 10,721,335 B2

REMOTE PROCEDURE CALL USING QUORUM STATE STORE

BACKGROUND

In the field of network computing, multiple computers or systems may be designed to work as a group to provide functionality for a distributed network application or environment. A distributed network environment generally refers to an environment where multiple computers share information amongst each other through a network communication mechanism. Typical network communication mechanisms include transport control protocol (TCP) Internet protocol (IP) networks, and session initiation protocol (SIP) networks. Other transport protocols also exist. In general, transport protocols define a standard for how different systems communicate with each other over the physical (e.g., wired networks or wireless transport) layer of the network. Other communication protocols (e.g., hypertext transport protocol (HTTP), file transport protocol (FTP), etc.) also exist at an application layer, to define how client applications and server applications communicate with each other. This application layer is generally a layer above the physical communication transport layer in accordance with the open systems interconnect (OSI) network model. By "connecting" different computer systems together those computer systems (and applications executing on them) may work together to execute different functional components of a distributed network application (e.g., distributed application). That is, in a distributed application, different computer systems may provide different types of functionality for the overall application or may serve as redundant components for a given functional component. There are many different mechanisms to allow different functional components of a distributed network application to communicate and share workload. One such mechanism is a remote procedure call (RPC).

BRIEF DESCRIPTION OF THE DRAWINGS

The present disclosure may be better understood from the following detailed description when read with the accompanying Figures. It is emphasized that, in accordance with standard practice in the industry, various features are not drawn to scale. In fact, the dimensions or locations of functional attributes may be relocated or combined based on design, security, performance, or other factors known in the art of computer systems. Further, order of processing may be altered for some functions, both internally and with respect to each other. That is, some functions may not require serial processing and therefore may be performed in an order different than shown or possibly in parallel with each other. For a detailed description of various examples, reference will now be made to the accompanying drawings, in which.

DETAILED DESCRIPTION

Figure 1:
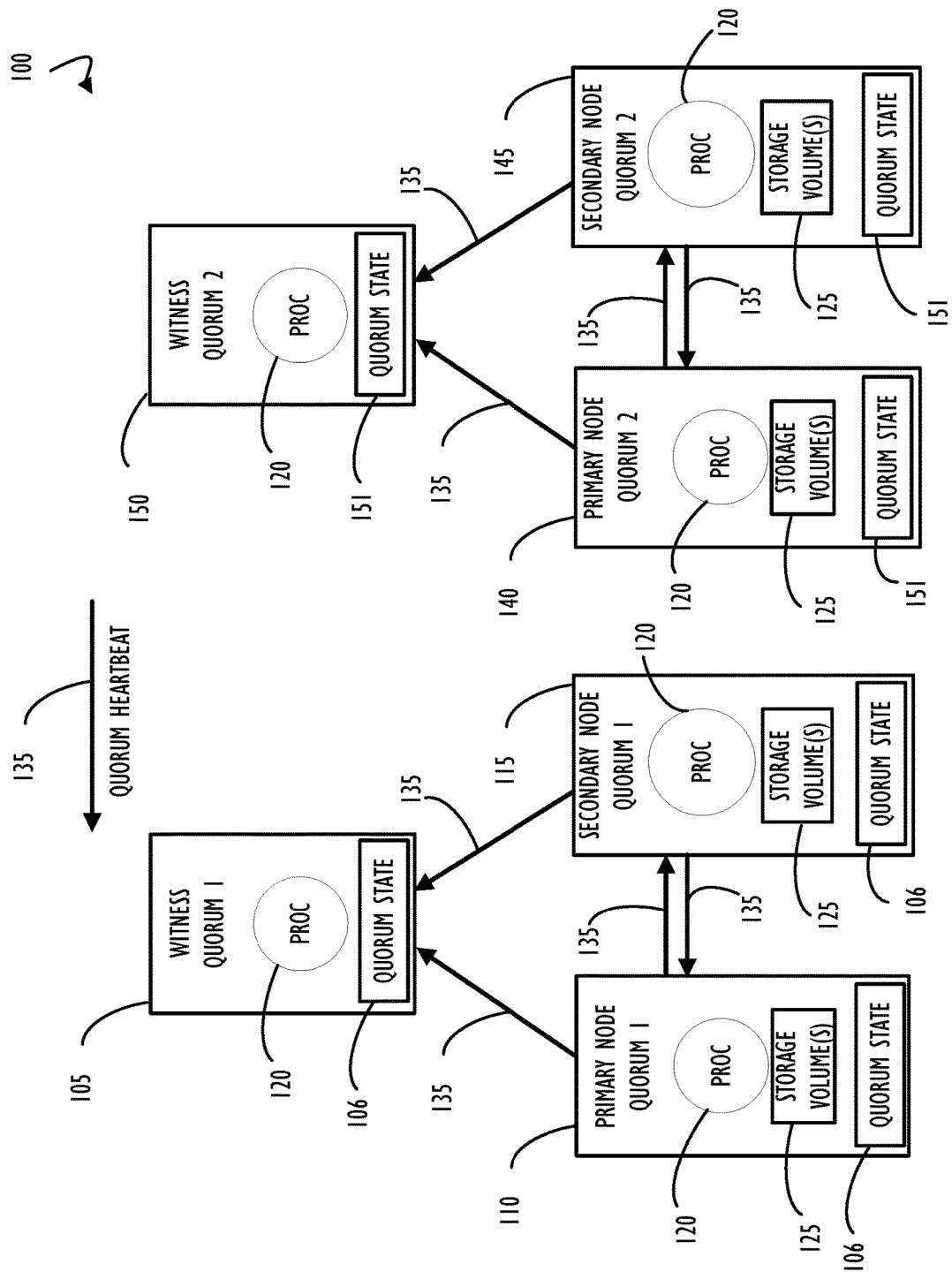
FIG. 1 is a functional block diagram representation of a network including two quorum datastores providing redundancy for data storage, according to one or more disclosed implementations.

Examples of the subject matter claimed below will now be disclosed. In the interest of clarity, not all features of an actual implementation are described in this specification. It will be appreciated that in the development of any such actual example, numerous implementation-specific decisions may be made to achieve the developer's specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

RPC is generally a request-response protocol. An RPC is initiated by the client, which sends a request message to a known remote server to execute a specified procedure with supplied parameters. The infrastructure for sending and receiving of information for an RPC is typically supplied by an operating system (OS) of the client and remote server. The remote server may send a response to indicate receipt of request to the requesting application on the client, and the requesting application may continue its process in parallel with the expected execution of the RPC. While the server is processing the RPC call, the client application may either be blocked (it waits until the server has finished processing the request in the RPC before resuming execution), or the client application may continue processing asynchronously to the request to the server. There are many variations and subtleties in various RPC implementations, resulting in a variety of different (possibly incompatible) RPC protocols. There are several important distinctions between local procedure calls and RPCs. One important difference is that remote applications and local applications typically do not share (or have access to) a common address space (e.g., execution address space of the OS). Another important difference between RPC and local calls is that remote calls can fail because of unpredictable network problems (or lack of direct network connectivity between the two systems). Applications making an RPC call are typically programmed to deal with such failures even without knowing whether the remote procedure was actually invoked. This disclosure provides a variation on typical RPC calls for a high-availability redundant distributed computing environment that may be used by nodes of a quorum-based cluster such as the quorum data storage implementation, examples of different possible implementations are explained in detail below.

In the field of network computing, an example of redundant storage may be provided by a plurality of redundant disks. In some cases, this redundancy may be implemented by having multiple redundant disks within a single computer system. An example of multiple disks within a single computer system is often referred to as a redundant array of inexpensive disks (RAID). RAID implementations have various levels (e.g., RAID0 to RAID6) depending on the number of disks, performance, and type of redundancy desired. The details of a particular RAID implementation are beyond the scope of this disclosure. RAID servers also often have redundant power supplies, network connections, and disk controllers, such that a single failure will not cause data to be inaccessible to other systems. However, typical RAID implementations are in a single device such that a dual failure on that single device, or loss of connectivity (e.g., network communication) to that single device may cause data to be unavailable.

To extend upon the availability of RAID redundancy, multiple servers at different locations may provide an added degree of availability in that connectivity to both locations (often geographically distant from each other) must be lost prior to having a data outage. Redundant geographically distant implementations are often referred to as a primary data center and a backup or remote data center. Further, for performance and cost reasons, a primary data center may host a first portion of all data and applications in a primary role and other data and applications (e.g., a second portion) in a backup role with the other data center performing the complementary role for the first and second portion. In this manner, when both data centers are available, primary applications are split between the two data centers with every redundant application having an available backup. Upon a failure of a data center, any applications that were executing in the backup role may assume primary role and the available data center may host all applications in a primary role (e.g., for the duration of unavailability of the failed data center). Each host (e.g., computer system) within a data center may implement its own redundancy using methods similar to those discussed above (e.g., RAID, redundant components, etc.).

Data between two servers functioning as a primary and a backup to each other should be kept synchronized such that, upon failover, current data as opposed to out-of-date (e.g., stale) data is available. One implementation to address this is referred to as a quorum data store that may execute on a cluster of nodes. In normal operation, the servers of a quorum exchange their roles and other coordination information (e.g., PRIMARY, SECONDARY, and the resource states) through heartbeat messages and synchronize their application start and stop procedures. In particular, in case of an application failover because of a software failure or a manual operation, the stop script which stops the application is first executed on the primary server, before executing the start script on the secondary server. Thus, replicated data on the secondary server has an internal consistency corresponding to a clean stop of the application. That is, data is not left in a condition of partial update with respect to database commits or application processing, for example. In a quorum data store (and the cluster supporting it) there may also be a "witness" node that does not necessarily participate in storing data but may assist in managing roles and coordinating state information of the quorum (e.g., host the quorum state store that is discussed further below).

In a quorum data store implementation, the basic mechanism for synchronizing two servers and detecting server failures is the quorum heartbeat message, which represents a monitoring data flow on a network shared by a pair of servers. That is, each server in a quorum may share a heartbeat message periodically with all other servers of the quorum. In general, a quorum may be made up of multiple actors within a failover unit. The failover unit includes a primary and one or more backup servers (e.g., nodes of a cluster). Quorum actors represent the set of quorum members that have volumes (physical or logical disk storage areas) on different nodes and possibly a single witness.

Each supported quorum node, by default, has a certain amount of state that it advertises to the rest of the cluster (e.g., through the above-mentioned heartbeat). This state information is inherent in the cluster control protocol and does not require additional levels of functionality to be implemented. For example, some implementations also implement a database application in the layer above the quorum-based state storage. In some cases, a state-storage engine (e.g., extra application) may be used to build a database type application that may use database entries to control an RPC request. In that type of implementation, a shared database can have records created for an RPC request and have that record deleted upon RPC completion. However, this type of implementation may require additional application support (e.g., the database application) and extra communication connectivity between nodes of a cluster (e.g., the database application may have to communicate with other database application instances executing on other nodes). In contrast, the disclosed RPC technique does not require any additional application layer over the standard cluster communication protocol.

In some cases, there is no availability for additional communication layers and there may be no direct communication between nodes. However, the quorum state store represents the limited (but required) connectivity between nodes. Further, the quorum state store may be shared throughout a quorum without direct communication between each of the different nodes. Simply put, each node of the quorum data store (e.g., cluster) shares a common view of the quorum state store (although for certain short periods of time the data may not be consistent, such as, when it is in the process of being updated). This potential inconsistency is not a concern for the disclosed RPC implementation as the data will become consistent over a short period of time based on standard quorum state store update processing (e.g., quorum heartbeat processing).

In some disclosed example implementations, each of the states of a shared quorum state store may include a monotonically incrementing version number. That is, for every update to a quorum state store a new unique number may be associated with the updated (e.g., new) state for that node. Also, in a quorum data store, each node has the permission to modify its own state and has the permission to examine states of other nodes in the cluster that hosts the quorum data store. This version number may be utilized to provide coordination and control of the disclosed RPC request and response mechanism.

Disclosed implementations allow for use of an existing quorum state store that is shared amongst all quorum members to initiate remote requests (e.g., remote procedure calls (RPCs)) to execute a procedure on a requested node in the cluster from a requesting node of the cluster. Different types of quorum-based clustering solutions allow maintenance of shared state between a cluster of machines (e.g., nodes) such that the shared state can be propagated to a node even if that node only has direct connectivity to some of the nodes in the duster at a given instant. That is, an intermediary node in the cluster may provide updated quorum state store information if a direct connection between any two nodes of the duster is not available. For example, the duster will maintain "eventual consistency." Accordingly, performing RPCs over a quorum-based clustering solution, using a quorum shared state store, may allow a node to request work to be performed on another node in the cluster to which the requesting node does not have a direct communication path. Thus, the disclosed RPC technique does not require additional connectivity (or even direct connectivity) between the requesting node and the requested node.

Authentication and execution rights may be inherited from a remote system quorum manager process rather than requiring transmission of authentication information. Thus, the disclosed implementations provide an RPC technique that leverages existing required components of a quorum data store as opposed to requiring additional components (e.g., additional database application) and represent an improvement to the functioning of the quorum data store and the duster of computers on which it is hosted.

Having the above understanding of RPCs, quorum data stores, quorum state stores, and quorum heartbeats, a high-level overview of the disclosed RPC technique is provided here, followed by a detailed implementation example explained with reference to the figures.

In an example implementation of this disclosure, an RPC may be implemented by leveraging the already existing and required shared state store of a quorum data store. In the disclosed implementation, an initial node (e.g., requesting or calling node) may provide information about an RPC request to another node (e.g., receiving node or processing node) using the following technique. First, a determination is made at Node A that it wants to have Node B perform an RPC function (called in this example FUNCTION_X). Node A may update the shared state of Node A (its own state) in the quorum shared state store by setting the last-known shared version number of the shared state of Node B in the request field of the shared state augmented record associated with Node A. The version number of a shared state record may be used for control and coordination of requests, as will be explained in more detail below. Along with the control information, the augmented record may be populated with an RPC ID to indicate that it is FUNCTION_X that is to be executed and an indication of Node B as the place for execution. Optionally, calling arguments may also be included in the augmented record. An example of an augmented request record is explained in more detail below with reference to FIG. 2. Thus, Node A has updated its own state to include both its state information that may be used in a standard fashion for the quorum data store and added additional information to support the disclosed RPC request technique.

As explained above, the state records of nodes are automatically shared across the different nodes of the quorum data store (e.g., propagated throughout the cluster nodes participating in the quorum data store). Accordingly, the state of Node A that includes this new augmented information may be propagated to all other nodes (including Node B). When, Node B performs its periodic read (e.g., a consensus read) of Node A's state (after propagation of course) or performs a read of Node A's state because of a notification of a change in Node A state, Node B may determine that there is an outstanding request for Node B because there is a request where RPC Node ID is B and the RPC request field has a version number that is less than or equal to the most up-to-date version available to Node B. Further, Node B may also maintain a completion sequence number that is greater than the request field. The completion sequence number may be maintained locally on Node B to indicate the most recent RPC that has already been accepted for processing. Thus, Node B may validate that an identified request in a different node's state may be an outstanding (e.g., unprocessed) request.

Node B, upon validating an outstanding request, may perform FUNCTION_X as requested by the augmented record information from the state record of the requesting node. As mentioned above, FUNCTION_X is representative of a function requested in the RPC for Node B to perform on behalf on Node A. Upon completion of FUNCTION_X, Node B may store the completion of the RPC (e.g., execution exit status of FUNCTION_X) by updating its own quorum shared state record (creating a new version number) and providing information in the RPC completed field of the shared state to indicate the node ID for which the RPC was completed. That is, Node B will update its state with a reference to Node A in the augmented state information. Node B may also set any status codes or response arguments necessary to respond to the requesting node (In this case Node A). An example of an RPC response message format is discussed in detail below with reference to FIG. 2.

Node A, upon a future read of Node B's state (e.g., after the quorum state store has been distributed as normal), may identify that the RPC request to Node B has completed because the completion version number associated with the RPC completed field is greater than the request number and the RPC node ID matches Node A's ID. Thus, the disclosed technique allows for nodes of a quorum data store to share state information in a normal manner and perform remote processing requests on behalf of other nodes without requiring additional communication or application infrastructure.

Referring now to FIG. 1, a functional block diagram is illustrated to represent a network including two quorum data stores, each of the two example quorum data stores of FIG. 1 are illustrated to provide redundancy for their respective data storage, according to one or more disclosed implementations. Note, that in this example quorum 1 and quorum 2 do not overlap in any manner. That is, they are independent quorums implemented on independent clusters of nodes in this example.

In the example of FIG. 1, witness node 105 for quorum 1 assists in providing information to that quorum to determine which of the storage nodes of the cluster are performing which role. In this example, primary node 110 is the primary node for quorum 1 and secondary node 115 is the backup node for quorum 1. Each of the nodes of the quorum data store share some common components that may not be identical to each other, but for the purposes of this disclosure may be considered functionally equivalent. For example, each node includes a processor 120 and a quorum state 106 (e.g., quorum state store information sometimes referred to as simply the quorum or quorum database). Primary node 110 and secondary node 115 also share a component illustrated as storage volume(s) 125. Storage volume(s) 125 represent data storage for which redundancy is provided by the quorum data store and may be implemented using redundant local storage techniques like the RAID infrastructure mentioned above or other storage techniques. Note that a disk does not exclusively refer to magnetic storage in any disclosed implementation. Other forms of storage may be functionally equivalent to a magnetic disk (e.g., optical disks, solid state storage, etc.) and provide the necessary requirements for storage volume(s) 125. Also, in FIG. 1, a second quorum (quorum 2) is illustrated with witness node 150, primary node 140, and secondary node 145. Note that quorum state 151 is different than quorum state 106 but similarly shared across all members of the quorum, in this case quorum 2.

Arrows are used in FIG. 1 to represent heartbeat messages 135 such as the above described quorum heartbeat that may be used to propagate state information for each of the nodes throughout the cluster of nodes participating in each quorum. The direction of the arrows in FIG. 1 represent the direction of the individual heartbeat messages 135. Data is also propagated throughout the quorum members periodically so that the contents of quorum state 106 remains consistent on each node. For example, as mentioned above, a node may be able to have read/write access for its own state and have read access to the state information (e.g., record in the quorum state store) associated with all other cluster nodes that are members of the same quorum. In this example, witness 105, primary node 110, and secondary node 115 may have read access to each other but not to any of the nodes in quorum 2 even if some nodes of quorum 2 are nodes of a cluster that overlaps with some of the nodes of a different quorum. That is, a quorum may or may not have a one-to-one correlation with a cluster, as a quorum data store may be hosted in a subset of a cluster and different quorum data stores may be hosted on a single cluster. These overlapping cases represent a more complicated configuration than is shown in FIG. 1 and are discussed in more detail below with reference to FIG. 4.

Figure 2:
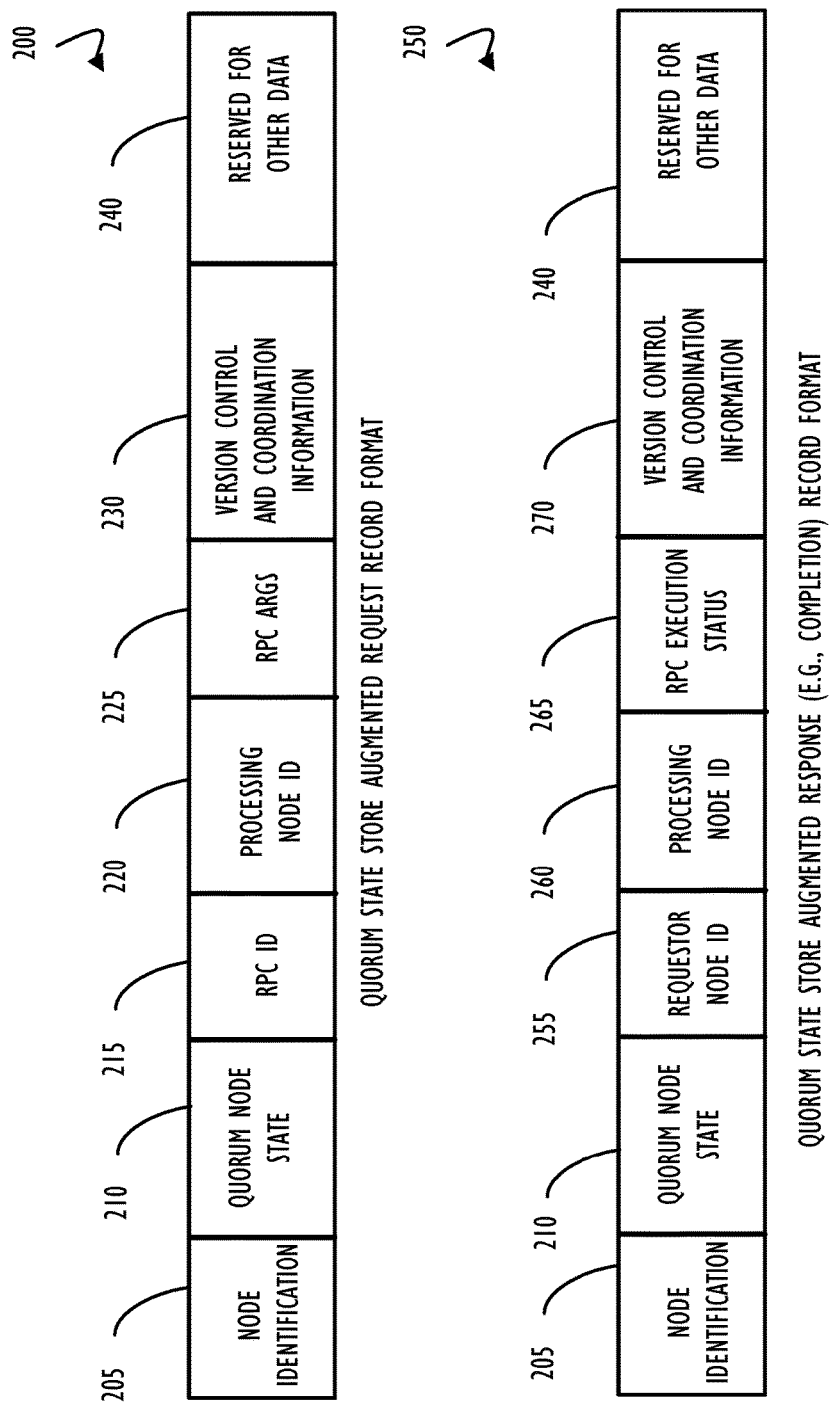
FIG. 2 is a block diagram representing one possible example of a format for a record in a quorum state store to provide information for an RPC request and one possible example of a format for a record in a quorum state store to provide information for an RPC response, according to one or more disclosed implementations.

Referring now to FIG. 2, two example message formats for a quorum heartbeat message augmented with information to support the disclosed RPC technique are shown, according to one or more disclosed implementations. A first message format represents one possible example of a format for a record in a quorum state store to provide information for an RPC request message 200. The second message format illustrated represents one possible example of a format for a record in a quorum state store to provide information for an RPC response message 250. Request message 200 includes a first element for node identification 205 that may be a key to the quorum state store in that it identifies the node for which the record reflects a current quorum state. There is typically only a single record for each node's current state, although other implementations are also possible. Quorum node state 210 represents the field (or fields) associated with information in the quorum state store for a node that is unaffected by the disclosed technique. The above-mentioned augmented information, in this example, is represented by elements 215 through 240.

Beginning with RPC ID 215, this field provides an indication of the procedure to be initiated remotely. In the above overview, this function was called FUNCTION_X. This field may include either the function name or, to save space, a numerical (or other) index to a pre-defined function. In any case, this field may be used by the remote machine (processing node) to determine what procedure to execute on behalf of the requesting node. Processing node ID 220 provides an indication for the receiving node to determine a request has been submitted (e.g., from requesting node) that is directed to that processing node. RPC ARGS 225 represents optional RPC arguments that may be provided for the function or procedure call when the procedure is executed at the receiving (i.e., processing) node. Version control and coordination information 230 represents information to ensure that requests are processed and completed in an orderly fashion. As explained above, one implementation may utilize the unique version number already present in some existing quorum state store implementations (other implementations are also possible). Reserved for other data 240 represents a field (or fields) of data that are not tied to any specific implementation and may provide for further extensions of the disclosed techniques.

FIG. 2 also illustrates example RPC response message 250 that, in a similar manner to RPC request message 200, has node identification 205 and quorum node state 210 that each represent standard quorum state store information. RPC response message 250 also contains a reserved for other data 240 field(s). Requestor node ID 255 represents a field to provide an indication on completion of an RPC to the requesting node that further information in this record is directed to that requesting node. Processing node ID 260 provides an indication of the node that has provided the procedure processing on behalf of the requesting node. RPC execution status 265, in this example, may be used to provide a completion code of the function executed. Version control and other information 270 may be used to provide control and coordination information, for example, to allow different nodes to maintain a status of outstanding requests and tie response messages to request messages.

Figure 3:
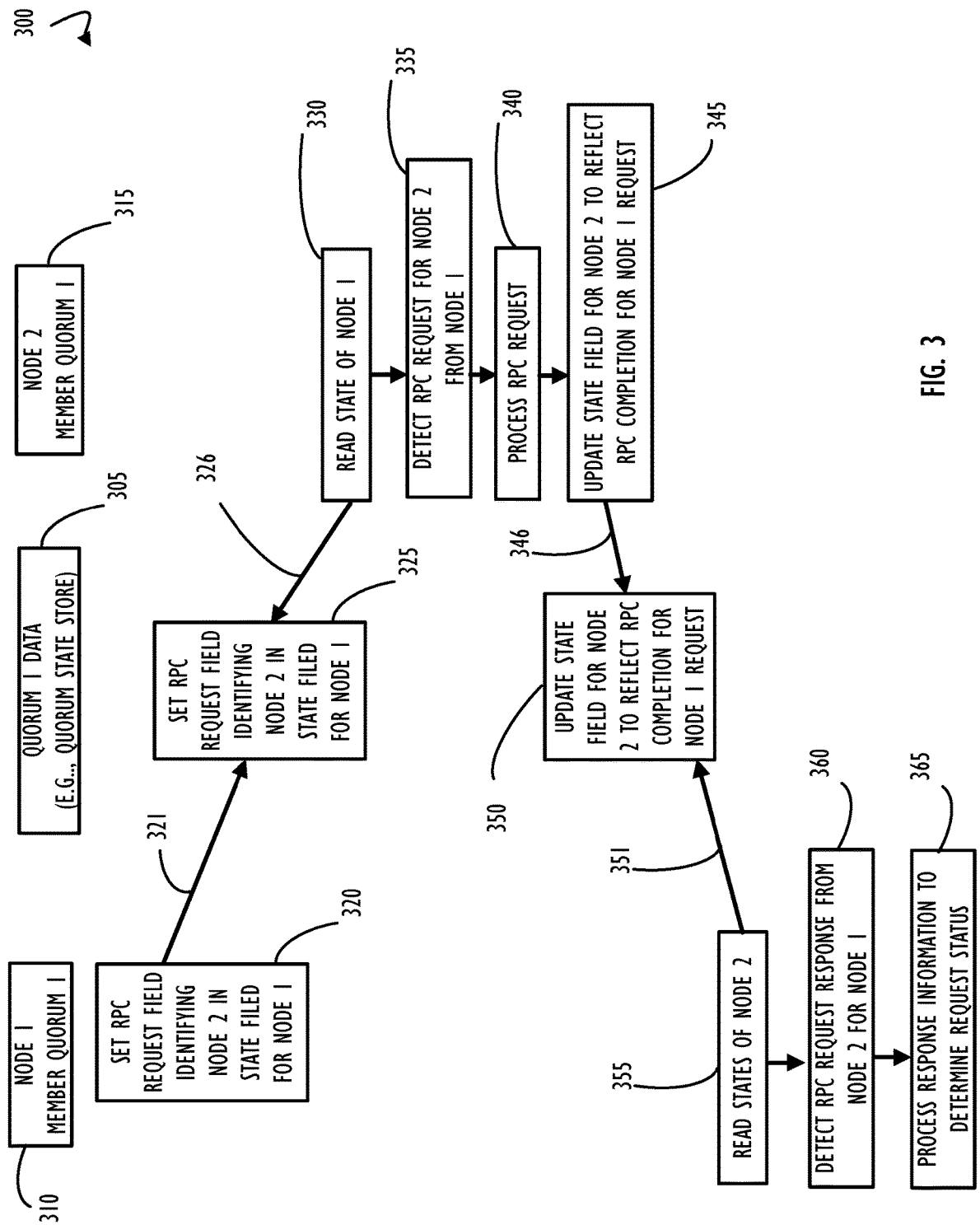
FIG. 3 is a block diagram representing an example control flow of information through a quorum state store to facilitate an RPC to a node in the quorum, according to one or more disclosed implementations.

Referring now to FIG. 3, block diagram 300 represents an example control flow 300 of information through a quorum state store 305 to facilitate an RPC from a requesting node (e.g., Node 1 310) to a processing node (Node 2 315) In the quorum, according to one or more disclosed implementations. Control flow 300 illustrates actions and data flow for at least two different nodes participating in a quorum data store. Recall that there may be more than two nodes participating in a single quorum data store. Beginning at block 320, Node 1 310 may set an RPC request filed (see RPC request message 200) to provide an indication to Node 2 315 that a function execution is desired on behalf of Node 1 310. This indication may be provided, as indicated by arrow 321 and block 325, through an update to the quorum state store 305 record associated with Node 1 310. At a later point in time (after propagation of quorum state store 305), block 330 and arrow 326 indicate that Node 2 315 may perform a read of the state of Node 1 310 from quorum state store 305. This read may be periodic or initiated in some manner (e.g., automatic notification of update to quorum state store 305). Block 335 indicates that Node 2 315 may detect the request from Node 1 310. Block 340 indicates that Node 2 315 may process the RPC request (possibly after validation or other security control check). Block 345 and arrow 346 indicate that, after completion of the requested RPC, Node 2 315 may update its own information in quorum state store 305 to provide a completion status for the request from Node 1 310. As explained above, this update may be the form of an RPC response message 250 and include information sufficient for the requesting node to determine that the augmented information is directed to that requesting node for a previously issued request. Block 355 and arrow 351 indicate that Node 1 310 may read the state of Node 2 315 (e.g., the quorum state store record of Node 2 315). Block 360 indicates that Node 1 310 may determine that there is a response for an outstanding request has been processed and block 365 indicates that Node 1 310 may process the information to maintain a status of outstanding requests and perform any actions desired after completion. For example, there may be a process waiting on Node 1 310 to execute after Node 2 315 has completed this request. Alternatively, if an error status is received at Node 1 310 with respect to this request, possible remediation actions may be initiated.

Figure 4:
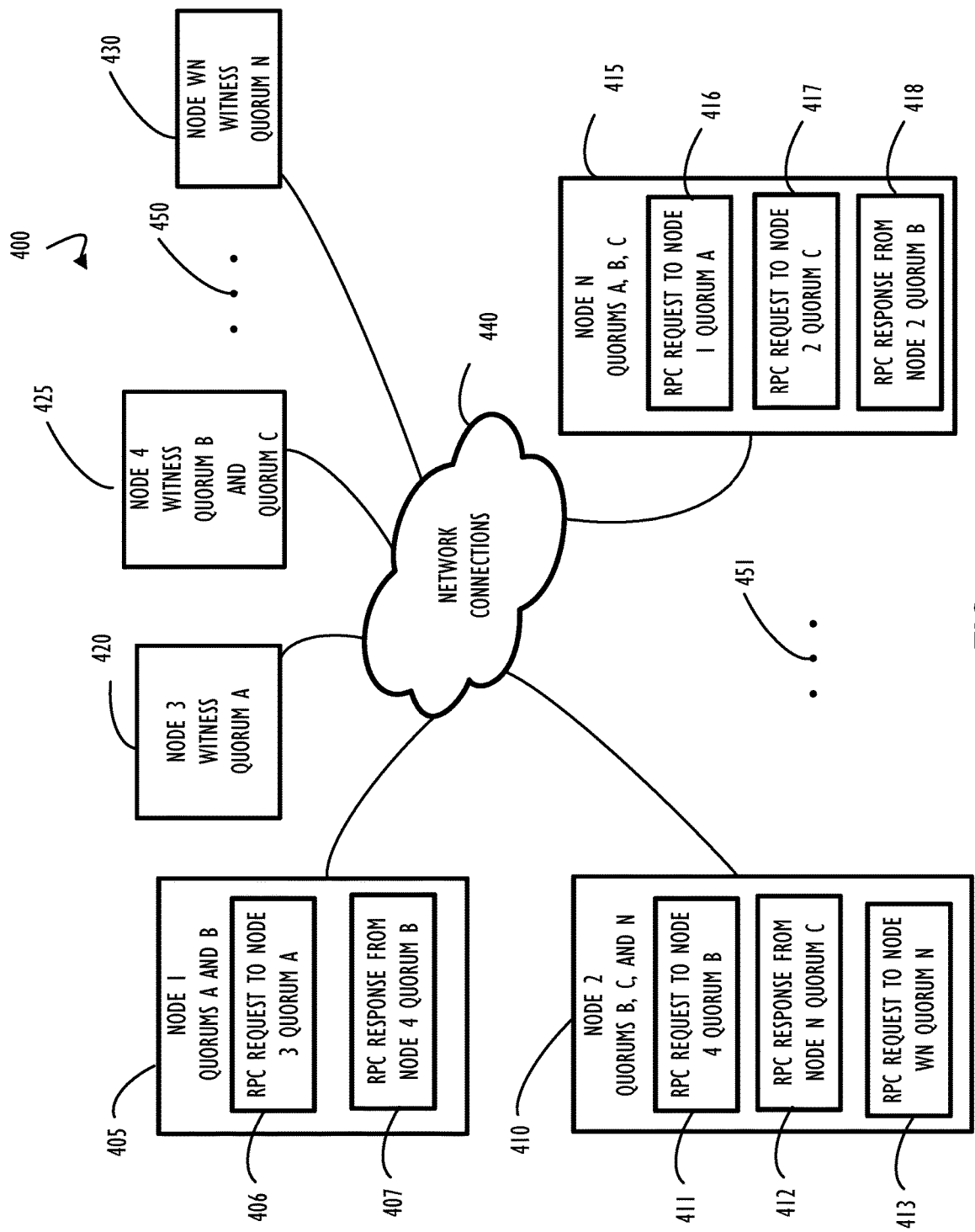
FIG. 4 is a block diagram representation of a distributed network environment including multiple computers (e.g., systems) and quorums of redundant data storage hosted by the multiple computers (e.g., 3-node clusters of quorum-based data storage), according to one or more disclosed implementations.

Referring now to FIG. 4 a block diagram 400 representation of a distributed network environment including multiple computers (e.g., systems or nodes) and quorums of redundant data storage hosted by the multiple computers is illustrated, according to one or more disclosed implementations. In this example there are multiple nodes, witnesses, quorums, and network connections represented. Any number of these elements is possible. In the example of FIG. 4, Node 1 405 hosts quorums A and B. Block 406 represents that Node 1 405 may initiate a request to Node 3 that is also a member for quorum A. Block 407 represents that Node 1 405 may receive a response from Node 4 425 that is part of quorum B with Node 1 405. Node 2 410 hosts quorums B, C, and N. Block 411 represents that Node 2 410 may initiate requests to other members of quorum B such as node 4 425. Block 412 represents that Node 2 410 may receive a response (e.g., from a previously issued request not shown) from Node N 415 for their shared quorum C. Block 413 represents that Node 2 410 may also send requests (e.g., via a quorum state store for quorum N) to Node WN 430. Block 416 represents that Node N 415 may initiate requests to Node 1 405 because they share a common quorum A. Block 417 represents that node N 415 may provide requests to Node 2 410 via quorum C. Block 418 indicates that node N 415 may receive responses from node 2 410 via quorum B. Ellipses 450 indicates that any number of witness nodes may be possible. Ellipses 451 indicates that any number of nodes may be possible. In short, a member of a quorum may send/receive RPC requests with other nodes that are members of the same quorum for which they are a member.

Also, in block diagram 400, network connections are represented as network connections cloud 440 to illustrate that there are many different ways to implement a network. For example, networks may have different topologies (e.g., bus, ring, mesh, star, tree, etc.). Also, networks may be implemented using different technologies for the physical layer (e.g., of the Open Systems Interconnection (OSI) model). Network communication devices may be used to interconnect different topologies of networks and types of networks to allow devices having many different types of network connections to communicate with each other. Further, direct communication between nodes may not be required because, as explained above, data in the quorum state store may be propagated throughout the quorum via other quorum members.

Figure 5:
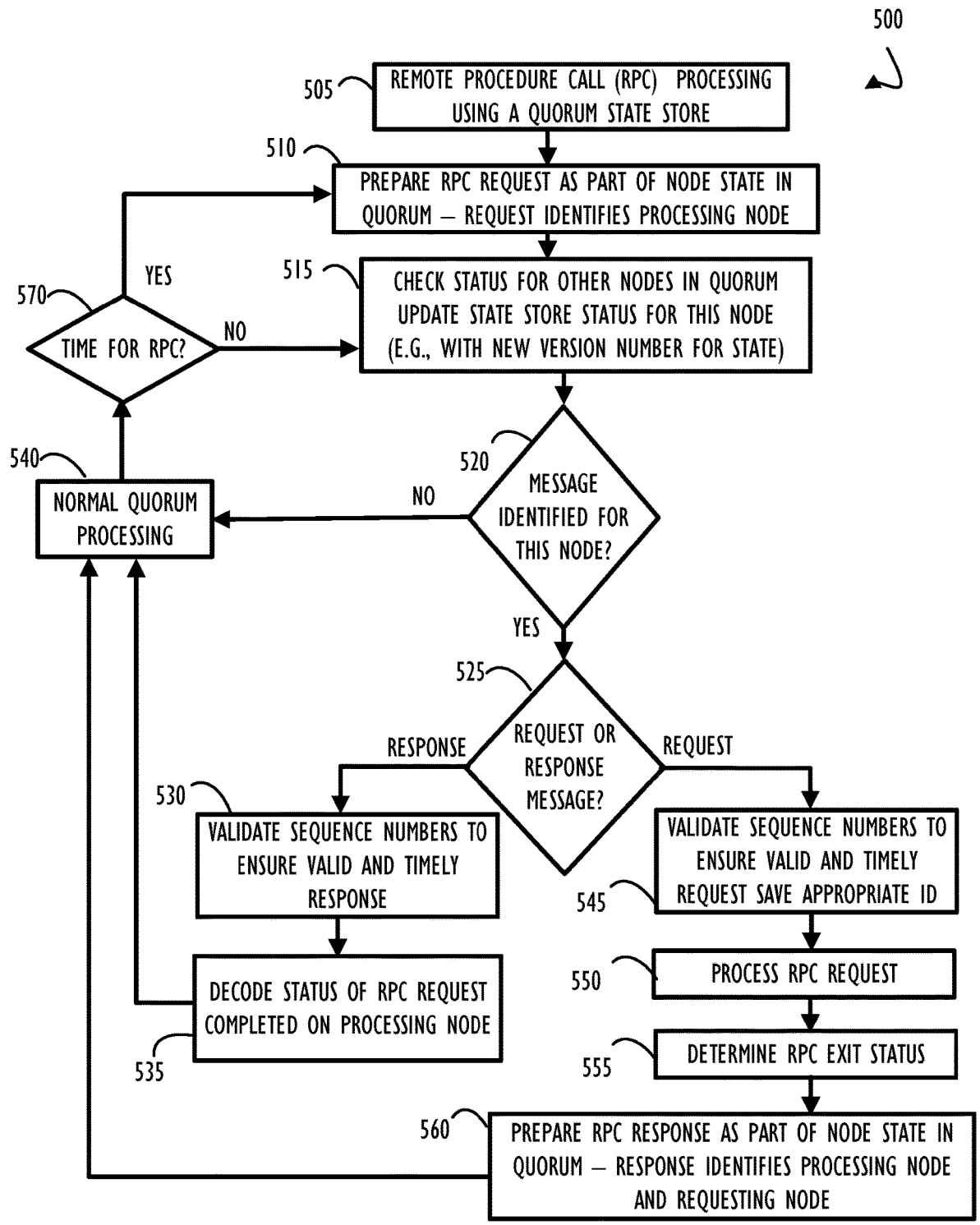
FIG. 5 is a flow chart representing a possible method to support network communication for a quorum state store RPC request and response, according to one or more disclosed implementations.

FIG. 5 is a flow chart representing a possible method to support network communication for a quorum state store RPC request and response, according to one or more disclosed implementations. Method 500 begins at block 505 where processing of an RPC using a quorum state store may be initiated. Block 510 indicates that an RPC request may be prepared at a requesting node and provided as part of a node state in a quorum for which that node is a member. The request may identify a processing node (also a member of the quorum) to facilitate (i.e., execute) the request. Block 515 indicates that a node in a quorum may periodically (or on demand) check the status (e.g., read the quorum shared state record) for other quorum nodes and may update its own state store status with each update having a new version number. This update may include augmented information for either a request or a response to an RPC as outlined above. Decision 520 indicates that, upon a check of the status of other nodes, a message may be identified for the current node. If not, the NO prong of decision 520, flow continues to block 540 for normal quorum processing. If there is a message identified for this current node, the YES prong of decision 520, flow continues to decision 525 where a determination may be made as to if this message represents a request for new processing or a response to processing previously requested for the current node.

If the identified message represents a request for processing, the REQUEST prong of decision 525, flow continues to block 545 where the request may be validated to ensure this is a valid request. Further authentication and other security procedures may also be performed to ensure this is a valid request. Block 545 also indicates that appropriate identification information may also be saved, such as the control and coordination information mentioned above. Block 550 indicates that the RPC may be processed on the current node. Block 555 indicates that a completion status of the RPC execution may be determined for providing to the requesting node. Block 560 indicates that a response message, that may be in a format similar to RPC response message 250 of FIG. 2, may be prepared. This response information may be included in a quorum state store update for the current node. To allow a response to be properly processed, the response message may include information about the processing node, requesting node, and other control and coordination information. After completion of the quorum state store update, flow for the current node may return to normal quorum processing at block 540.

Alternatively, if the identified message represents a response from previously requested processing, the RESPONSE prong of decision 525, flow continues to block 530 where information from a response message, that may be of a format similar to RPC response message 250, may be decoded for the current node. The message may include coordination and control information that may be used by the current node to validate and associate response messages with previous requests. Block 535 indicates that a completion status of the request may also be obtained from the response message. The current node may perform any further processing (not shown) desired upon completion of the outstanding request (e.g., wake up suspended function, perform a next local function, issue alert, etc.) and may then return to normal quorum processing at block 540.

Decision 570 represents an exit to normal quorum processing block 540. If another RPC request is desired for the current node, the YES prong of decision 570, flow can return to block 510 where an RPC request may be prepared. If another RPC request is not desired, the NO prong of decision 570, flow returns to block 515 for a check of the status of other quorum members. Again, this check at block 515 may be periodic or initiated at the request of some other process (e.g., on demand). In this manner, a node may provide information and receive information (e.g., RPCs) through a quorum state store with other members of the same quorum.

Figure 6:
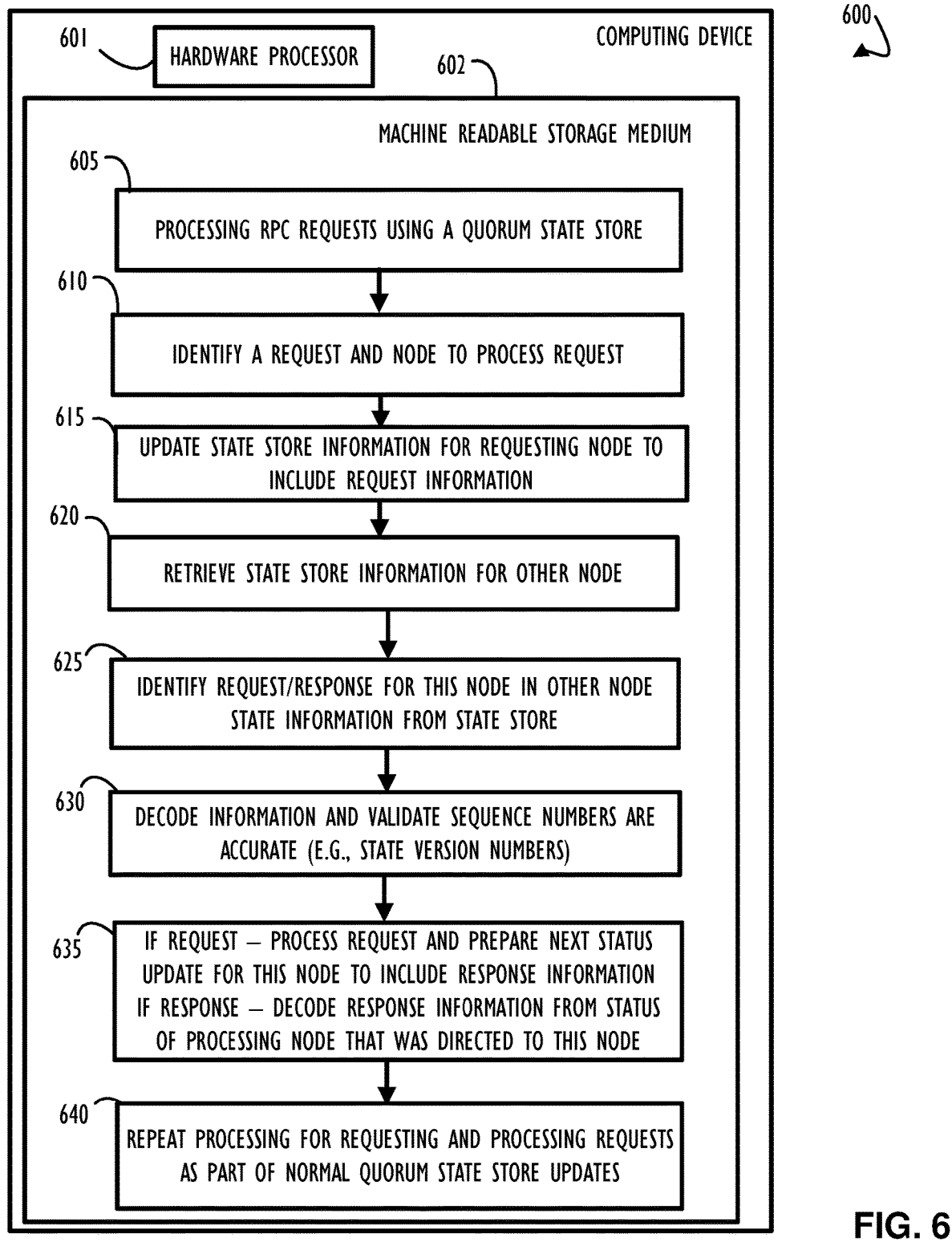
FIG. 6 is a block diagram representing a computing device implementing a method to support communication for a quorum state store RPC request and response, according to one or more disclosed implementations.

FIG. 6 is a block diagram representing a computing device 600 to support communication for a quorum state store RPC request and response, according to one or more disclosed implementations. Computing device 600 includes at least one hardware processor 601 and a machine readable storage medium 602. As illustrated, machine readable medium 602 may store instructions, that when executed by hardware processor 601 (either directly or via emulation/virtualization), cause hardware processor 601 to perform one or more disclosed methods to support RPCs throughout members of a quorum. In this example, the instructions stored reflect a method similar to method 500 discussed above.

Beginning at block 605, the stored instruction may be directed toward processing RPC requests using a quorum state store (e.g., quorum state store 305 of FIG. 3). Block 610 indicates that a request and a node to process that request may be identified. Block 615 indicates that a record associated with a current in a quorum state store may be updated to include augmented information for an RPC request to be performed by a remote node. Block 620 indicates that the other node may receive the augmented information from the quorum state store. Note that the stored instructions in this example may be executed by a node that is both the requestor of RPCs and the processing node for requests from other nodes. Block 625 indicates that the retrieved information may be either a request or a response. Block 630 indicates that information in the record being processed may be decoded and validated. Block 635 indicates that if the information pertains to a request, the request may be processed, and a response message prepared. Alternatively, if the information pertains to a response, the response may be processed locally. Block 640 indicates that this processing of request/response messages may be repeated as part of normal quorum state store record processing as explained above for method 500 of FIG. 5.

Figure 7:
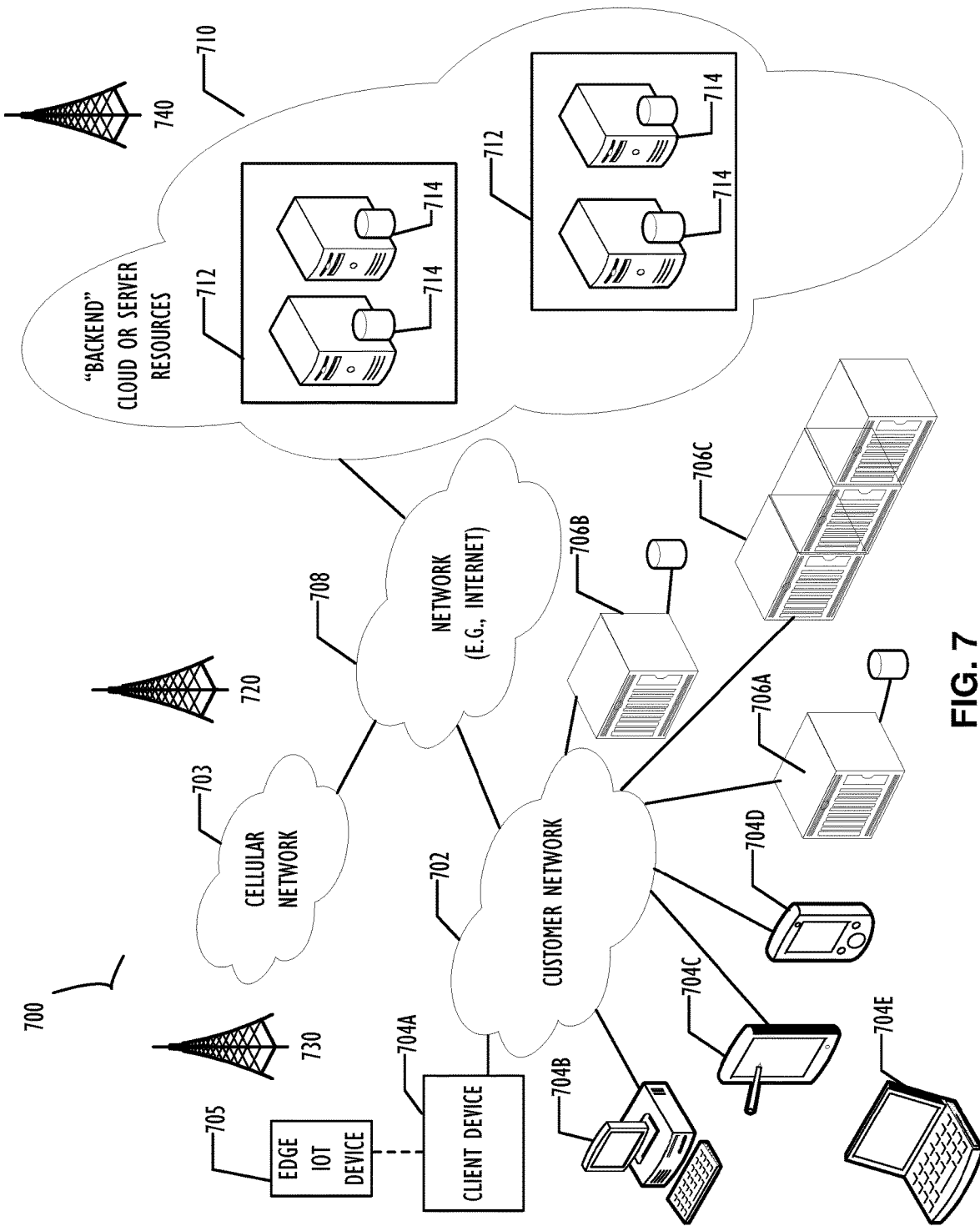
FIG. 7 represents a computer network infrastructure that may be used to implement all or part of the disclosed quorum state store RPC implementation, according to one or more disclosed implementations.

FIG. 7 represents a computer network infrastructure that may be used to implement all or part of the disclosed quorum state store RPC implementation, according to one or more disclosed implementations. Network infrastructure 700 includes a set of networks where implementations of the present disclosure may operate. Network infrastructure 700 comprises a customer network 702, network 708, cellular network 703, and a cloud service provider network 710. Each of these different networks may include one or more quorum redundant data storage implementations that may benefit from the concepts of this disclosure. In one implementation, the customer network 702 may be a local private network, such as local area network (LAN) that includes a variety of network devices that include, but are not limited to switches, servers, and routers.

Each of these networks can contain wired or wireless programmable devices and operate using any number of network protocols (e.g., TCP/IP) and connection technologies (e.g., WiFi® networks, or Bluetooth®. In another implementation, customer network 702 represents an enterprise network that could include or be communicatively coupled to one or more local area networks (LANs), virtual networks, data centers and/or other remote networks (e.g., 708, 710). In the context of the present disclosure, customer network 702 may include one or more high-availability data stores (e.g., quorum data store), switches, or network devices using methods and techniques such as those described above.

As shown in FIG. 7, customer network 702 may be connected to one or more client devices 704A-E and allow the client devices 704A-E to communicate with each other and/or with cloud service provider network 710, via network 708 (e.g., Internet). Client devices 704A-E may be computing systems such as desktop computer 704B, tablet computer 704C, mobile phone 704D, laptop computer (shown as wireless) 704E, and/or other types of computing systems generically shown as client device 704A. In this context, client devices should not be confused with a client application of an RPC because they represent devices in a client-server architecture rather than applications. However, while it is true that client devices may often run client applications, there are situations where a client device will execute the server side of a client-server application such that the client device communicates with a server device (e.g., executing the client application) to request remote execution on behalf of the client device. That is, the client device may execute a server application portion with the server device executing the client application portion for a given client-server application architecture. In general, the client portion of an application is the portion that requests some work and receives the results of the work, with the server portion receiving the request for work, performing that work, and providing the results.

Network Infrastructure 700 may also include other types of devices generally referred to as Internet of Things (IoT) (e.g., edge IOT device 705) that may be configured to send and receive information via a network to access cloud computing services or interact with a remote web browser application (e.g., to receive configuration information).

FIG. 7 also illustrates that customer network 702 includes local compute resources 706A-C that may include a server, access point, router, or other device configured to provide for local computational resources and/or facilitate communication amongst networks and devices. For example, local compute resources 706A-C may be one or more physical local hardware devices to support a quorum datastore as outlined above. Local compute resources 706A-C may also facilitate communication between other external applications, data sources (e.g., 707A and 707B), and services, and customer network 702.

Network infrastructure 700 also includes cellular network 703 for use with mobile communication devices. Mobile cellular networks support mobile phones and many other types of mobile devices such as laptops etc. Mobile devices in network infrastructure 700 are illustrated as mobile phone 704D, laptop computer 704E, and tablet computer 704C. A mobile device such as mobile phone 704D may interact with one or more mobile provider networks as the mobile device moves, typically interacting with a plurality of mobile network towers 720, 730, and 740 for connecting to the cellular network 703.

FIG. 7 illustrates that customer network 702 is coupled to a network 708. Network 708 may include one or more computing networks available today, such as other LANs, wide area networks (WAN), the Internet, and/or other remote networks, in order to transfer data between client devices 704A-D and cloud service provider network 710. Each of the computing networks within network 708 may contain wired and/or wireless programmable devices that operate in the electrical and/or optical domain.

In FIG. 7, cloud service provider network 710 is illustrated as a remote network (e.g., a cloud network) that is able to communicate with client devices 704A-E via customer network 702 and network 708. The cloud service provider network 710 acts as a platform that provides additional computing resources to the client devices 704A-E and/or customer network 702. In one implementation, cloud service provider network 710 includes one or more data centers 712 with one or more server instances 714. Cloud service provider network 710 may also include one or more frames or clusters (and cluster groups) representing a scalable compute resource that may benefit from the techniques of this disclosure. Also, cloud service providers typically require near perfect uptime availability and may use the disclosed techniques, methods, and systems to provide that level of service.

Figure 8:
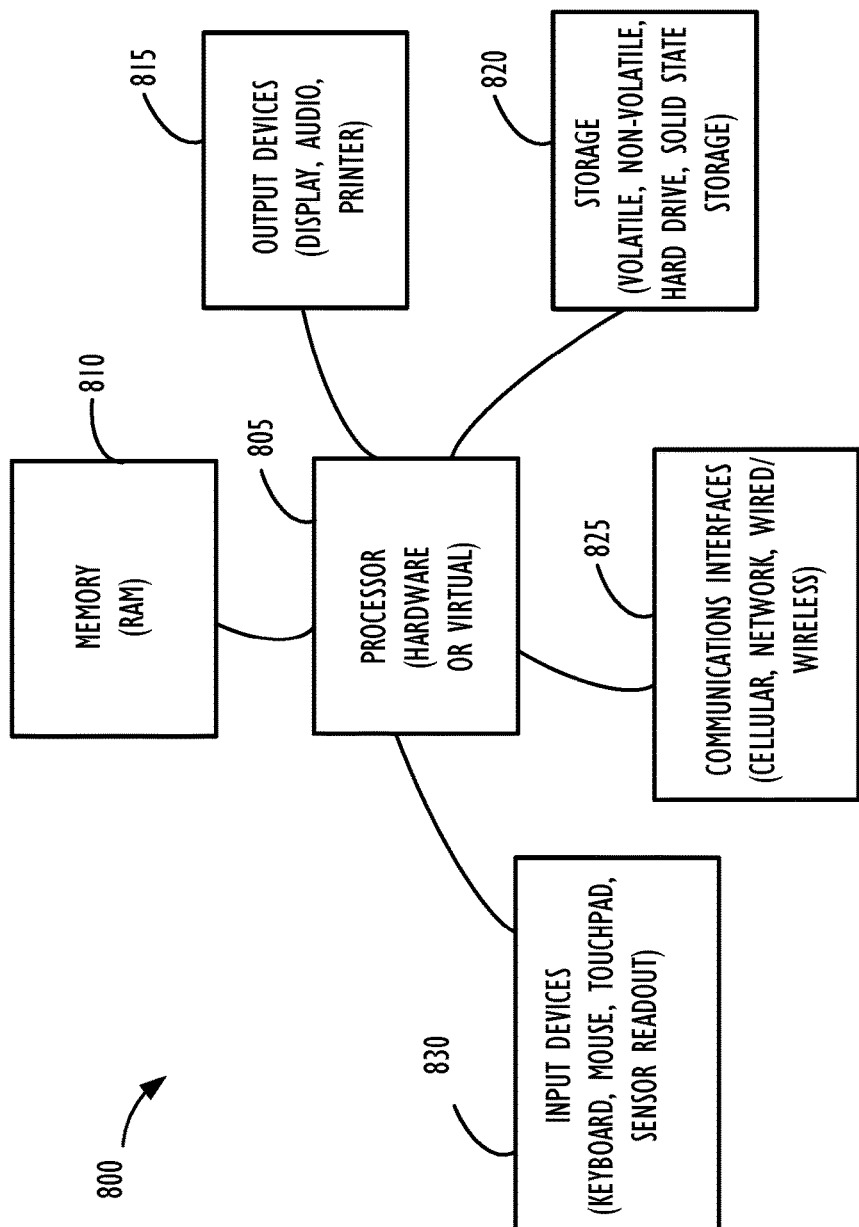
FIG. 8 illustrates a computer processing device that may be used to implement the functions, modules, processing platforms, execution platforms, communication devices, and other methods and processes of this disclosure.

FIG. 8 illustrates a computing device 800 that may be used to implement or be used with the functions, modules, processing platforms, execution platforms, communication devices, and other methods and processes of this disclosure. Specifically, a computing device 800 may represent either Node A or Node B from the above example of Node A using an RPC to request FUNCTION_X to be performed at Node B on behalf of Node A. Alternatively, an instance of computing device 800 may be used to implement a network communication device that facilitates network transmission between nodes of a cluster. Generally, computing device 800 may implement any of the nodes of FIGS. 1-4 or include instructions to implement method 500 or be a computing device containing a computer readable medium as shown in FIG. 6. For example, computing device 800 illustrated in FIG. 8 could represent a client device or a physical server device and include either hardware or virtual processor(s) depending on the level of abstraction of the computing device. In some instances (without abstraction), computing device 800 and its elements, as shown in FIG. 8, each relate to physical hardware. Alternatively, in some instances one, more, or all of the elements could be implemented using emulators or virtual machines as levels of abstraction. In any case, no matter how many levels of abstraction away from the physical hardware, computing device 800 at its lowest level may be implemented on physical hardware.

As also shown in FIG. 8, computing device 800 may include one or more input devices 830, such as a keyboard, mouse, touchpad, or sensor readout (e.g., biometric scanner) and one or more output devices 815, such as displays, speakers for audio, or printers. Some devices may be configured as input/output devices also (e.g., a network interface or touchscreen display).

Computing device 800 may also include communications interfaces 825, such as a network communication unit that could include a wired communication component and/or a wireless communications component, which may be communicatively coupled to processor 805. The network communication unit may utilize any of a variety of proprietary or standardized network protocols, such as Ethernet, TCP/IP, to name a few of many protocols, to effect communications between devices. Network communication units may also comprise one or more transceiver(s) that utilize the Ethernet, power line communication (PLC), WiFi, cellular, and/or other communication methods.

As illustrated in FIG. 8, computing device 800 includes a processing element such as processor 805 that contains one or more hardware processors, where each hardware processor may have a single or multiple processor cores. In one implementation, the processor 805 may include at least one shared cache that stores data (e.g., computing instructions) that are utilized by one or more other components of processor 805. For example, the shared cache may be a locally cached data stored in a memory for faster access by components of the processing elements that make up processor 805. In one or more implementations, the shared cache may include one or more mid-level caches, such as level 2 (L2), level 3 (L3), level 4 (L4), or other levels of cache, a last level cache (LLC), or combinations thereof. Examples of processors include but are not limited to a central processing unit (CPU) a microprocessor. Although not illustrated in FIG. 8, the processing elements that make up processor 805 may also include one or more of other types of hardware processing components, such as graphics processing units (GPU), application specific integrated circuits (ASICs), field-programmable gate arrays (FPGAs), and/or digital signal processors (DSPs).

FIG. 8 illustrates that memory 810 may be operatively and communicatively coupled to processor 805. Memory 810 may be a non-transitory medium configured to store various types of data. For example, memory 810 may include one or more storage devices 820 that comprise a non-volatile storage device and/or volatile memory. Volatile memory, such as random-access memory (RAM), can be any suitable non-permanent storage device. The non-volatile storage devices 820 can include one or more disk drives, optical drives, solid-state drives (SSDs), tap drives, flash memory, read only memory (ROM), and/or any other type of memory designed to maintain data for a duration of time after a power loss or shut down operation. In certain instances, the non-volatile storage devices 820 may be used to store overflow data if allocated RAM is not large enough to hold all working data. The non-volatile storage devices 820 may also be used to store programs that are loaded into the RAM when such programs are selected for execution.

Persons of ordinary skill in the art are aware that software programs may be developed, encoded, and compiled in a variety of computing languages for a variety of software platforms and/or operating systems and subsequently loaded and executed by processor 805. In one implementation, the compiling process of the software program may transform program code written in a programming language to another computer language such that the processor 805 is able to execute the programming code. For example, the compiling process of the software program may generate an executable program that provides encoded instructions (e.g., machine code instructions) for processor 805 to accomplish specific, non-generic, particular computing functions.

After the compiling process, the encoded instructions may then be loaded as computer executable instructions or process steps to processor 805 from storage device 820, from memory 810, and/or embedded within processor 805 (e.g., via a cache or on-board ROM). Processor 805 may be configured to execute the stored instructions or process steps in order to perform instructions or process steps to transform the computing device into a non-generic, particular, specially programmed machine or apparatus. Stored data, e.g., data stored by a storage device 820, may be accessed by processor 805 during the execution of computer executable instructions or process steps to instruct one or more components within the computing device 800.

A user interface (e.g., output devices 815 and input devices 830) can include a display, positional input device (such as a mouse, touchpad, touchscreen, or the like), keyboard, or other forms of user input and output devices. The user interface components may be communicatively coupled to processor 805. When the output device is or includes a display, the display can be implemented in various ways, including by a liquid crystal display (LCD) or a cathode-ray tube (CRT) or light emitting diode (LED) display, such as an organic light emitting diode (OLED) display. Persons of ordinary skill in the art are aware that the computing device 800 may comprise other components well known in the art, such as sensors, powers sources, and/or analog-to-digital converters, not explicitly shown in FIG. 8.

Certain terms have been used throughout this description and claims to refer to particular system components. As one skilled in the art will appreciate, different parties may refer to a component by different names. This document does not intend to distinguish between components that differ in name but not function. In this disclosure and claims, the terms "including" and "comprising" are used in an open-ended fashion, and thus should be interpreted to mean "including, but not limited to. . . . " Also, the term "couple" or "couples" is intended to mean either an indirect or direct wired or wireless connection. Thus, if a first device couples to a second device, that connection may be through a direct connection or through an indirect connection via other devices and connections. The recitation "based on" is intended to mean "based at least in part on." Therefore, if X is based on Y, X may be a function of Y and any number of other factors.

The above discussion is meant to be illustrative of the principles and various implementations of the present disclosure. Numerous variations and modifications will become apparent to those skilled in the art once the above disclosure is fully appreciated. It is intended that the following claims be interpreted to embrace all such variations and modifications.

What is claimed is:

1. A computer-implemented method of providing remote procedure call functionality from a requestor node to a processing node using a quorum state store communication protocol, the method comprising:
   retrieving, at a processing node, a first quorum state record reflecting a state of a requestor node in a quorum, the first quorum state record further containing:
      an indication of both the processing node and the requestor node;
      remote procedure call (RPC) request information; and
      information including first version coordination information;
   analyzing the RPC request information and the first version coordination information to identify an unprocessed request from the requestor node for the processing node;
   processing the unprocessed request, in part, by executing the RPC at the processing node;
   determining a status of execution for the RPC after execution; and
   updating a second quorum state record reflecting a state of the processing node in the quorum, the second quorum state record further containing:
      RPC completion information, comprising:
         the status of execution for the RPC;
         second version coordination information; and
         an identifier of the requestor node,
      wherein the RPC completion information is sufficient for the requestor node to later determine a completion status of a previously requested RPC on the processing node.

2. The computer-implemented method of claim 1, wherein the first version coordination information and the second version coordination information each include an instance of a monotonically incrementing version number across a set of nodes in a quorum and associated with an individual node state.

3. The computer-implemented method of claim 1, wherein the quorum is a quorum data store.

4. The computer-implemented method of claim 1, wherein the requestor node and the processing node are not in direct communication.

5. The computer-implemented method of claim 1, wherein the first quorum state record is propagated to the processing node via an intermediary member of the quorum.

6. The computer-implemented method of claim 1, wherein the processing node is a member of the quorum and at least one additional quorum concurrently.

7. The computer implemented method of claim 1, wherein the requestor node and the processing node are located remotely from each other at different data centers.

8. The computer-implemented method of claim 1, wherein the first quorum state store record is propagated to the processing node via a quorum heartbeat message.

9. The computer-implemented method of claim 8, wherein the requestor node and the processing node do not utilize additional application communication to facilitate propagation of the RPC request other than the quorum heartbeat message.

10. A computer device, comprising:
   a network controller communicatively coupled to a first network; and
   one or more hardware processors including a first hardware processor communicatively coupled to the network controller;
   a first memory communicatively coupled to the first hardware processor, the first memory containing information regarding a quorum state store; and
   a second memory communicatively coupled to the first hardware processor, the second memory storing instructions, that when executed by the first hardware processor, cause the first hardware processor to:
      obtain, at the computer device via the first network, a first quorum state record reflecting a state of a requestor node in a quorum, the first quorum state record further containing:
         an indication of both the processing node and the requestor node;
         remote procedure call (RPC) request information; and
         information including RPC execution coordination information;
      update the quorum state store based on the first quorum state record;
      identify, in the quorum state store, an unprocessed request from the requestor node for the computer device;
      process the unprocessed request, in part, by executing a function identified in the RPC request information on the computer device;
      determine a status of execution for the function after execution; and
      update a second quorum state record reflecting a state of the computer device in the quorum, the second quorum state record further containing:
         RPC completion information, comprising:
            the status of execution for the function;
            updated RPC execution coordination information; and
            an identifier of the requestor node,
         wherein the RPC completion information is sufficient for the requestor node to later determine a completion status of a previously requested RPC on the computer device.

11. The computer device of claim 10, wherein the RPC execution coordination information and the updated RPC execution coordination information each include version information pertaining to versions of records of the quorum state store.

12. The computer device of claim 11, wherein the version information represent respective instances of a monotonically incrementing version number across a set of nodes in a quorum and associated with an individual node state.

13. The computer device of claim 10, wherein the first quorum state store record is obtained as part of a quorum heartbeat message.

14. The computer device of claim 10, wherein both the computer device and the requestor node are members of the quorum and the quorum is a quorum data store.

15. The computer device of claim 10, wherein the first quorum state record is obtained via the first network from a network message originating at a remote device other than the requestor node.

16. The computer device of claim 15, wherein the requestor node, the computer device, and the remote device are members of a quorum data store.

17. A non-transitory computer readable medium comprising computer executable instructions stored thereon that when executed by one or more hardware processors, perform a remote procedure call (RPC) using a quorum state store communication protocol between a requestor node and a processing node, the instructions executable to:
    identify a processing node to perform a remote function execution of a first function via an RPC;
    update a first quorum state store record of a quorum state store, the first quorum state store record for a requestor node to indicate a state of the requestor node in a quorum data store, the first quorum state store record including an identification of the processing node and the requester node, RPC request information indicating the first function, and first version coordination information;
    interrogating the quorum state store to obtain information from a second quorum state store record associated with the processing node, a second quorum state store record updated by the processing node after the processing node has performed execution of the first function;
    determining from the second quorum state store record that the processing node has completed execution of the first function, the second quorum state store record including RPC completion information, comprising a status of the execution of the first function, second version coordination information, and an identifier of the requestor node.

18. The non-transitory computer readable medium of claim 17, wherein the instructions are further executable to:
    pause execution of an application on the requestor node based on the update of the first quorum state store record; and
    resume execution of the application on the requestor node after obtaining the execution status of the first function.

19. The non-transitory computer readable medium of claim 17, wherein the requestor node and the processing node are located remotely from each other at different data centers and both the requestor node and the processing nodes are members of a quorum data store implemented on a cluster.

20. The non-transitory computer readable medium of claim 17, wherein the instructions are further executable to:
    pause execution of an application on the requestor node based on the update of the first quorum state store record; and
    issue an error message from the requestor node after obtaining the execution status of the first function based on an error in execution of the first function on the processing node.

* * * * *